May 27, 1952 D. LEVKOFF 2,598,569
MACHINE FOR SETTING-UP BOX BLANKS
Filed Feb. 7, 1948 10 Sheets-Sheet 1

INVENTOR.
David Levkoff
BY
William F. Nickel
ATTORNEY.

May 27, 1952 D. LEVKOFF 2,598,569
MACHINE FOR SETTING-UP BOX BLANKS
Filed Feb. 7, 1948 10 Sheets-Sheet 3

INVENTOR.
David Levkoff
BY
William F. Nickel
ATTORNEY.

May 27, 1952 D. LEVKOFF 2,598,569
MACHINE FOR SETTING-UP BOX BLANKS
Filed Feb. 7, 1948 10 Sheets-Sheet 4

INVENTOR.
David Levkoff
BY
William F. Nickel
ATTORNEY.

May 27, 1952  D. LEVKOFF  2,598,569
MACHINE FOR SETTING-UP BOX BLANKS
Filed Feb. 7, 1948  10 Sheets-Sheet 7

INVENTOR.
David Levkoff
BY
William F. Nickel
ATTORNEY.

May 27, 1952           D. LEVKOFF           2,598,569

MACHINE FOR SETTING-UP BOX BLANKS

Filed Feb. 7, 1948           10 Sheets-Sheet 9

INVENTOR.
David Levkoff
BY
William F. Nickel
ATTORNEY.

May 27, 1952 D. LEVKOFF 2,598,569
MACHINE FOR SETTING-UP BOX BLANKS
Filed Feb. 7, 1948 10 Sheets-Sheet 10

INVENTOR.
David Levkoff
BY
William F. Nickel
ATTORNEY.

Patented May 27, 1952

2,598,569

UNITED STATES PATENT OFFICE 2,598,569

MACHINE FOR SETTING-UP BOX BLANKS

David Levkoff, Great Neck, N. Y.

Application February 7, 1948, Serial No. 6,904

5 Claims. (Cl. 93—53)

This invention is an improved apparatus for setting up folded articles of sheet material of such formation as to be adapted for use as boxes or cartons for merchandise; and thus produce cartons or receptacles by bending and securing the parts of the structure in their intended positions.

The improvement set forth herein is of the same general construction as the apparatus set forth in my prior copending applications, Serial No. 758,814, filed July 3, 1947, for patent on Apparatus and Method for Setting Up Box Blanks, which matured into Patent No. 2,587,050, granted February 26, 1952, and Serial No. 630,821, filed November 26, 1945, for patent on a Folding Box Set-Up Machine, upon which I have been granted Patent No. 2,464,407, March 15, 1949.

An important object is to provide a machine of this type that is simpler in construction, contains fewer parts, all of which coact with greater efficiency, and is capable of operating more rapidly and give a larger output.

The objects and advantages of the invention are all made clear in the following description and the novel features are pointed out in the appended claims. But this specification discloses only a preferred embodiment of the invention, and changes may of course be made without deviation from the general plan or design by which the invention is distinguished.

Numeral 1 indicates a vertical supply hopper of any suitable construction. It is open at the top and bottom and closed at the sides, but open at both front and rear. The sides have ribs or flanges along both their vertical edges, with the flanges at the front presented to the flanges at the back to prevent displacement of the folded boxes 2 edgewise from said hopper. This hopper is loaded with a number of such cardboard boxes 2, which are impelled and displaced flatwise through the open lower or discharge end thereof as they are delivered to the apparatus; and at the bottom the hopper has fixed converging extensions or bending members 3, one of which is attached to each side of the same. The members 3 support the weight of the hopper and they are affixed in any suitable manner at their lower ends to the top of the framework 4 that carries the working parts of the apparatus. The folded boxes 2 are made according to the design set forth in my prior Patent No. 2,342,551, granted February 22, 1944, and have folded flaps 5 at both extremities and connected along score lines to end sections that are adapted to be bent upward when the blank is worked into its final state and all parts thereof are set up in their intended positions.

To effect the delivery of the folded boxes 2 from the hopper 1, I employ pneumatic means comprising a pair of suction cup members 6 which are mounted upon a cross bar or member 7 which moves up and down in the framework 4. This movement is permitted because the ends of the cross bar 7 engage vertical channelled guide bars 8 at the two sides of the machine; and when the suction cups are in contact with the lowermost blank in the hopper 1 and evacuated of air, the downward movement of the guide bar 7 will pull the blank directly engaged by these cups out of the hopper and bring the end sections into contact with the converging extensions 3. This causes the end sections to be bent upward in the manner required, and the parts for the sides of the box are set up at this stage. In the further operation of the machine the end sections are engaged by pivoted arms 9 disposed to move through recesses 10 in the bending extensions 3 at the two sides of the machine; and by these arms they are bent further in such a manner as to secure the ends and sides permanently in vertical position with respect to the bottom of the box, which thus receives its final shape. Then each box is engaged by a discharge conveyor in the form of a sprocket chain 11 having projections 12. As the conveyor runs the projections 12 impel each box outward from the front of the machine where it can drop into a basket or other receptacle for receiving it.

The framework 4 of the machine has any suitable design and comprises a base 13 upon which are uprights or posts connected by cross bars for stiffening the structure, and conveniently mounting the various actuating parts. On the base 13 is an electric motor 14, the shaft 15 of which carries a grooved pulley 16 engaging a belt 17. This belt passes over a similar pulley 18 on a shaft 19 mounted in the casing 20 of a speed reducing unit which has a driven shaft 21 projecting to the exterior of the casing 20 and carrying a pulley 22. This pulley drives a similar pulley 22 on a shaft 24 above it through the agency of a belt 23, the shaft 24 being supported in bearings 25 at the sides of the machine and carrying a sprocket gear 26. Above the shaft 24 is a shorter shaft 27 parallel thereto and carrying a sprocket gear 28 connected to the gear 26 by a chain 29. On the shaft 27 is a rigid crank disk 30 having a crank arm 31 pivotally connected to the transverse bar 7 by a link 32, this link being connected to the arm 31 by a pin 33 and to the bar 7 at the middle by a pin or bolt 34. The motor will therefore transmit power to the shaft 27, which will act through the crank disk 30 to shift the bar 7 and the suction cups up and down.

The belt 17 driven by the motor 14 also passes over a gear 35 on the shaft of a pump 37 secured in the framework 4. To this pump leads a pipe 38 which has a pair of nipples 39 and is also joined to a casing 40 having a controlling valve therein. The nipples 39 are each united by a length of flexible tubing 6a to one of the two sections of piping 6' which carry the suction cups 6 at their upper ends. These pipes 6' are affixed to the bar 7 by lateral horizontal arms 7a attached to the bar 7 in any suitable manner and adjustably mounted in horizontal slots 7b in the bar or member 7. The valve in the casing 40 is operated by a cam 41 on the shaft 27 through a pivoted arm 42 having a roller 43 in its outer end in contact with the cam and pressing upon the outer end of the stem 44 of the valve. The pump works continuously and as long as the valve in the casing 40 is shut the cups 6 will be evacuated. When the cam 41 depresses the arm 42, the valve of the casing 40 will be open and the pressure in the tubing 6a and the cups 6 will then become equal to the pressure of the atmosphere. The cam is so timed that the force of suction is exerted to pull the blanks 2 down, and the cam 41 opens the valve in the casing 40 when the downward movement of each folded box is terminated and the formation of a box accomplished; so that the vacuum cups will release the boxes when the discharge of the latter from the machine is ready to start. The shaft of the pump is indicated at 36.

The pumping out of the cups 6 of course unbalances the air pressure on the folded boxes, and the downward pressure of the atmosphere thereon is the real unbalanced force that impels the folded boxes through the open bottom of the hopper and carries their end sections into engagement with the bending members 3. Of course a different number of cups can be utilized.

The arms 9 swinging through the openings 10 at the lower ends of the extensions 3 are mounted on pivots 45 on bars 46. The movement of each arm is produced by a lever 47 mounted on a pivot or journal 48 and connected to the arm 9 by a link 49. The ends of each bar or plate 46 are rigidly connected in any suitable manner to two plates 50 in which the journal 48 is mounted. At the side of each journal 48 is another journal 51 that is mounted in the plates 50 and carries a gear 52. This gear meshes with a smaller gear on each shaft 48. Each gear 52 is connected to a rack bar 54 having teeth 55, this bar being mounted in vertical position and operated upward and downward. The downward movement of the bars causes the arms 9 to swing toward each other and the upward movement withdraws the arms 9. The bars move in guides 56 supported above the level of the shafts 48 and 51, and the downward movement thereof is produced by electromagnetic coils 57, one at each side of the hopper 1, to turn both gears 52 and 53, the latter being rigid with arm 47.

Figures 3, 9, 11:
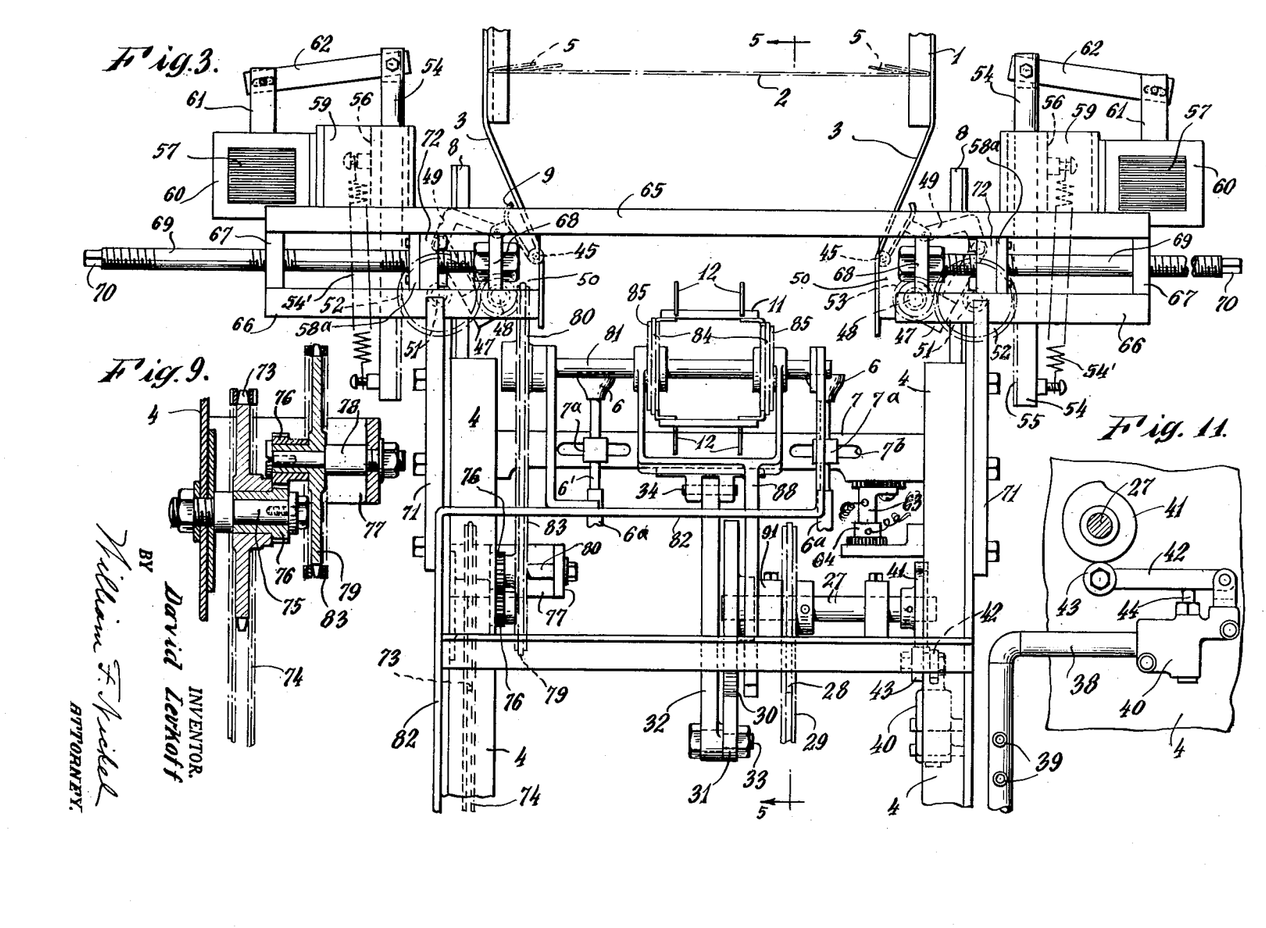
Figure 3 is a front view of same.
Figures 9, 10 and 11 are detail views of some of the operating connections.
Figures 4, 10:
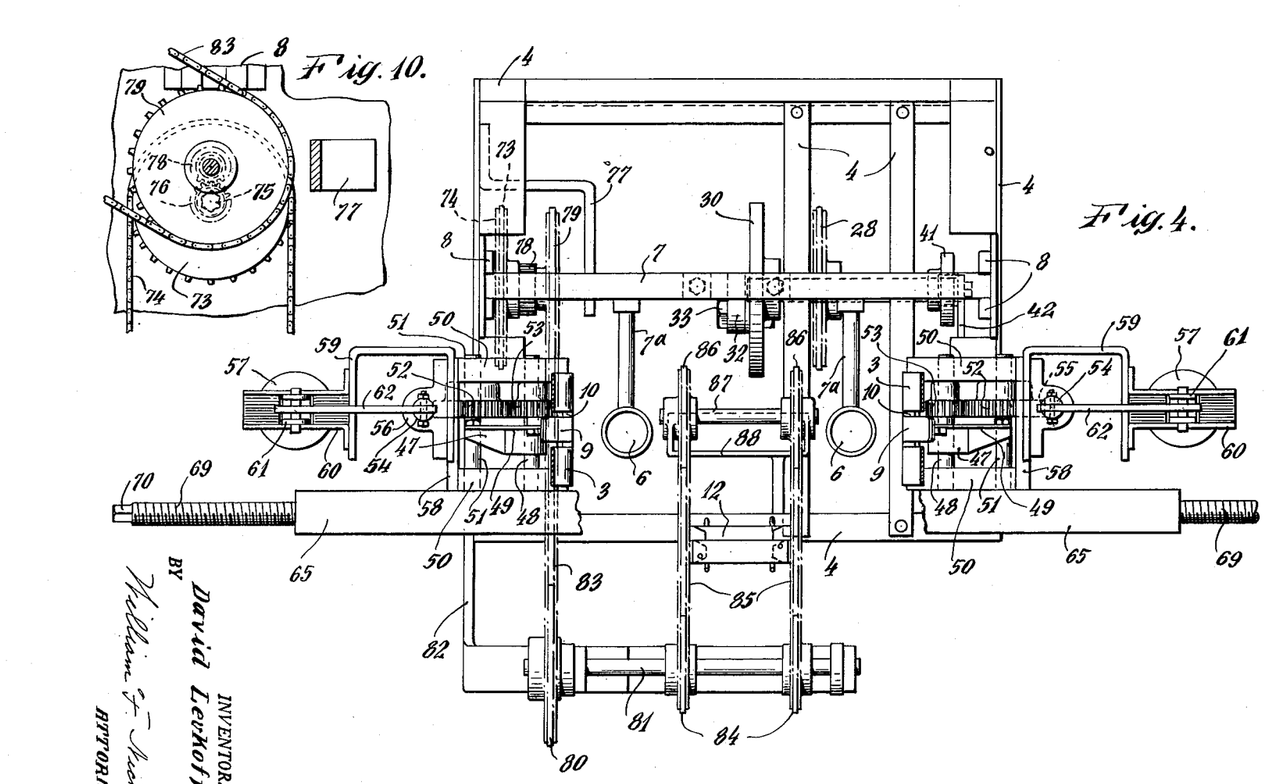
Figure 4 is a top view thereof, the hopper and driving motor and connections being omitted.

Each two plates 50 connected at one end by the bar 46 are also bridged at the opposite end by a plate 58, and at the top of each plate 58 and secured rigidly in position in any suitable manner is a bracket 59 to which the guide 56 is made fast. Each bar 46 and associated plates 50 and 58 make a box-shaped frame carrying the shafts 48 and 51 and the gears 52 and 53. Each bracket 59 has the shape of a horizontal U with the guide 56 attached to one arm and the other arms supporting frames or casings 60 of the magnets 57. These magnets may have any suitable shape but are preferably solenoids with armature cores 61 projecting from the tops. The upper ends of those cores 61 are rigidly united to bars 62 rigidly secured to the upper ends of the racks 54. The tops of the cores are recessed to receive the arms 62 and are pinned or riveted thereto. Springs 54' secured to the lower ends of the bars 54 and to the guides 56 normally hold the rack bars 54 in raised positions, and the arms 9 retracted as in Figure 3.

Figure 1:
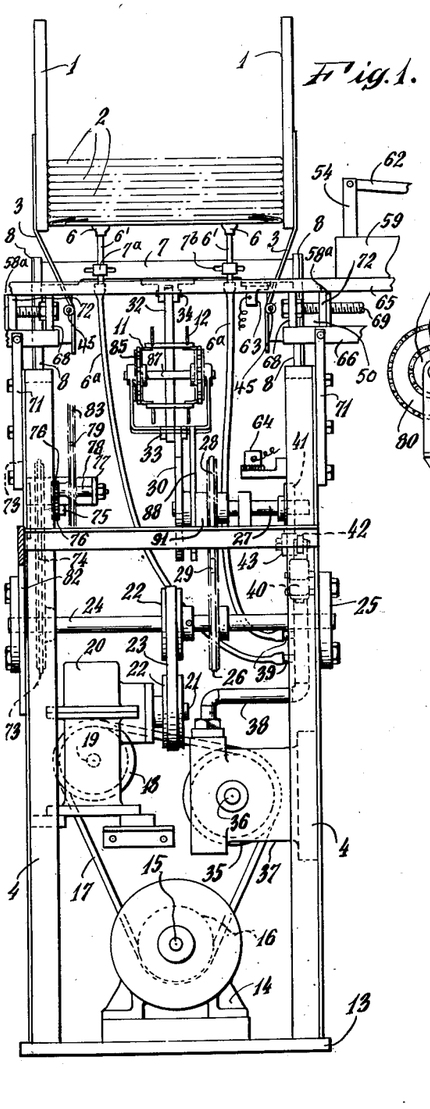
Figure 1 is a front view of an apparatus according to this invention, seen from the plane of line 1—1 on Figure 2.
Figure 2:
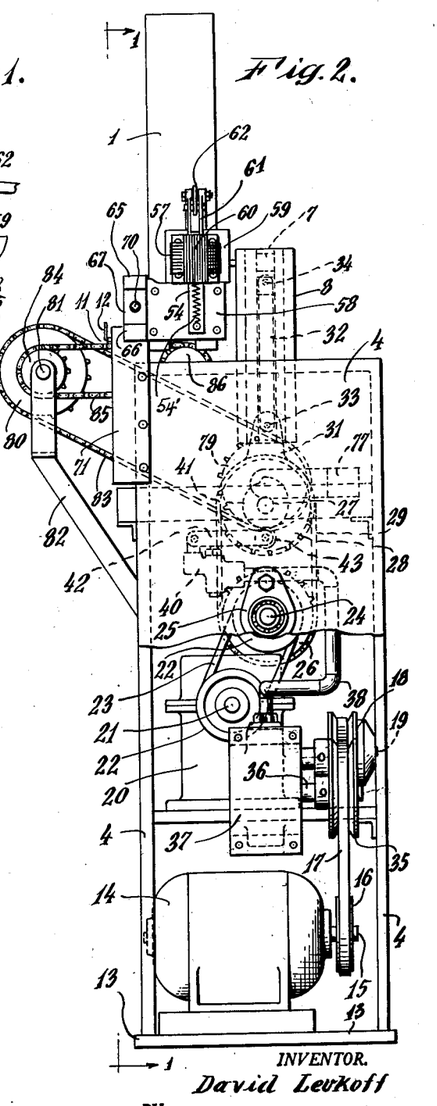
Figure 2 is a side view thereof.

In practice the magnets are energized whenever the bar 7 drops to such position as to make the operation of the arms 9 necessary. For this purpose the circuit of the magnets is controlled by a movable terminal 63 therein, carried by the bar 7 into engagement with a stationary terminal 64 in the circuit when the bar 7 is down far enough for the arms 9 to operate. See Figures 1 and 3. Any other controlling device may be employed. The terminal 64, suitably insulated, is attached to the framework 4.

The arms 9 can be adjusted with respect to the extensions 3 to have the most efficient action on the end sections of the blanks 2. For this purpose a cross bar 65 is mounted at the front of the machine projecting at both sides. Below each end of this bar 65 are two shorter bars 66 connected to the bar 65 by spacing elements 67 and 68. The bar 65 with the bars 66 and the elements 67 and 68 thus provides a horizontal rectangular frame at the top of the machine, and at each side. Each frame carries an adjusting rod 69 with a squared end 70. This rod has threaded engagement with the adjacent outer element 67 and its inner end projects through the other element 68 and is held against shifting longitudinally by nuts on both faces of the element 68. The bar 66 is supported by upright frame members 71 secured to the sides of the framework 4 and to the bar 66 at their upper ends. Instead of nuts, washers secured by cross pins in the bars 69 against both faces of the element 68 may be used. Between the bar 65 and the two bars 66 are guide blocks 72 which have threaded engagement with the rods 69. Hence when the rods are turned the guide blocks 72 will be shifted towards or from the extensions 3; the spacing elements 67 and 68 being rigid with the bars 65 and 66.

Each of the frames carrying the arms 9 has a lateral extension 58a which is part of the plate 58, and this extension is secured to the block 72 by bolts or other suitable fastening means. Each frame with the gears for operating the arms 9 may rest upon suitable supports on top of the framework 4, and whenever the rods 69 are turned each frame will be moved along the top of the framework 4 until the arms 9 reach the position desired.

To operate the conveyer for discharging the set-up box from the machine the shaft 24 carries also at one side of the framework 4 a sprocket 73 connected to a similar sprocket above it by a chain 74. The upper sprocket 73 is mounted on a shaft 75 supported in bearings on the framework 4 and having a gear 76. This gear meshes with a similar gear 76 mounted on a similar shaft 78 supported in bracket 77 on the framework 4 and rigid with a sprocket 79. The sprocket 79 is connected to another sprocket 80, on a shaft 81 supported in bearings at the top of a bracket 82 affixed to the front of the framework, by a chain 83. The shaft 81 carries sprocket gears 84 connected by chains 85 to sprockets 86 on a shaft 87. The chains 85 carry projections 12 and the shaft 85 is supported upon bearings carried by a yoke 88, the lower end of which has a slot 89 and secured by bolts 90 to a cross bar 91 on the frame 4. The position of the sprockets 86 can thus be adjusted. Likewise the bracket 82 may have a slot 92 in its lower end and be held in place by one or more bolts 93 in said slot to enable the bracket 82 to be adjusted as may be required.

Figures 12, 13:
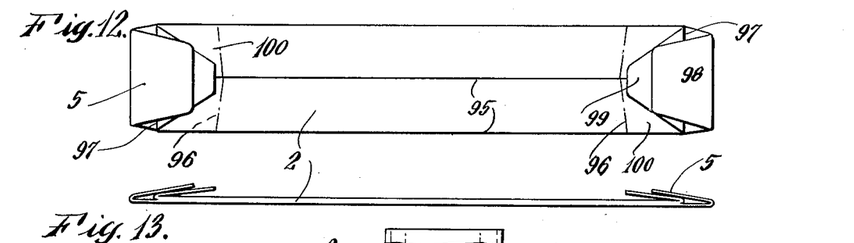
Figures 12 and 13 are top and side views of a blank to be transformed into a finished box with my invention.
Figure 15:
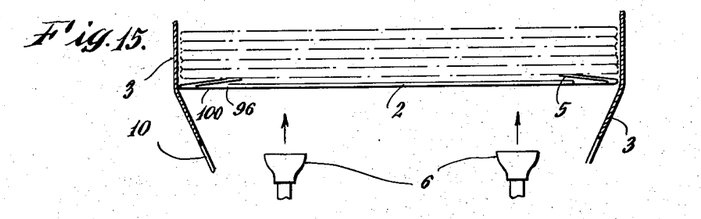
Figures 15 to 20 inclusive are side or edge views of folded or collapsed boxes in successive stages as they are worked in the practice of my invention.

The folded boxes 2 are made of folded sheet material bent along parallel lines to make three layers of equal width. The layers adjacent the edges are glued together to make the bottom; and the central layer on top will be cut along the middle longitudinally as indicated at 95. See Figures 12 and 13. When the portions of the top layer on both sides of line 95 are bent upward they make the sides 95' of the box, and the other two layers form the bottom. The structure is fully described in my aforesaid Patent No. 2,342,551. The box has transverse creases or score lines 96 marking the end sections 100 in double layers carrying flaps 98 and 99, which are folded down when the blanks go into the hopper. At the extremities of the cut 95 in the top layers of the sections 100 are folding flaps 101 that connect the sides 95' to the end sections 100 and are adapted to be laid against the inner faces of the end sections when the box is set up. In the bottom of the box are apertures 102 for the insertion of the ends of the flaps 99 to hold the ends and sides in set-up position.

Figures 5, 14:
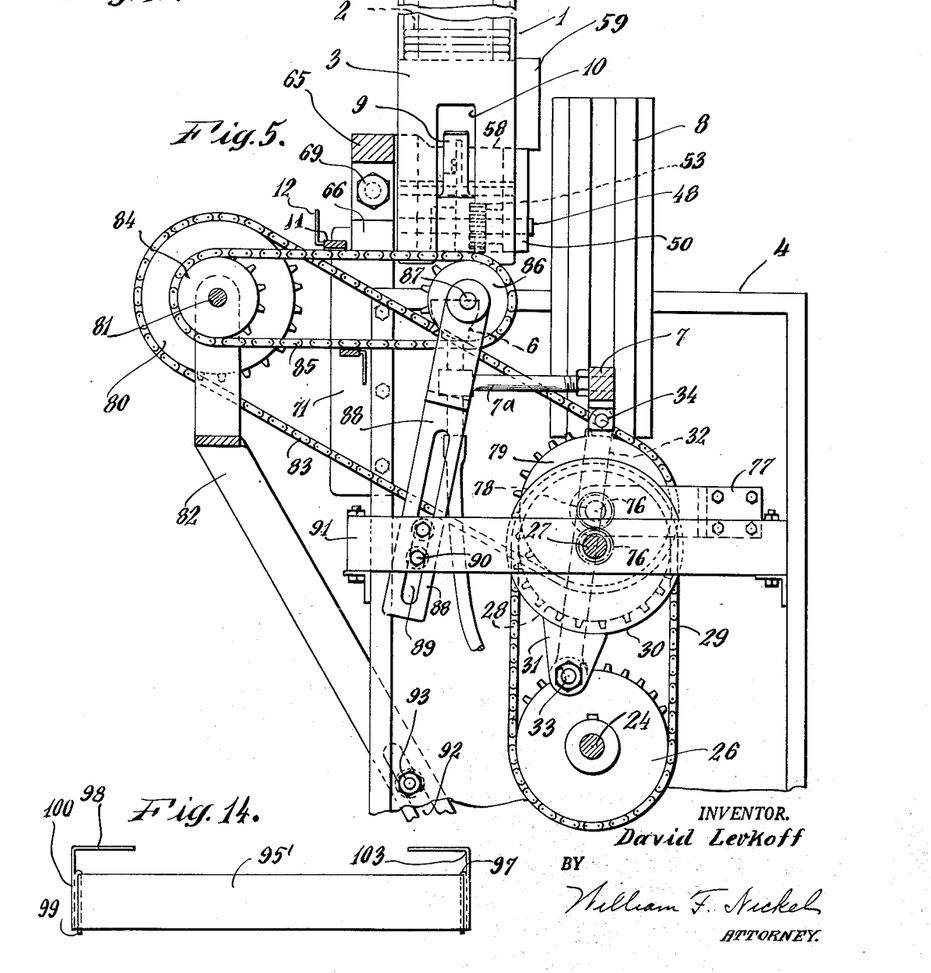
Figure 5 is a side view of the upper portion, on an enlarged scale, seen from a plane marked by line 5—5 in Figure 3.
Figure 14 is a side view of such a box in its finished state.
Figures 16, 17, 18, 19, 20, 21:
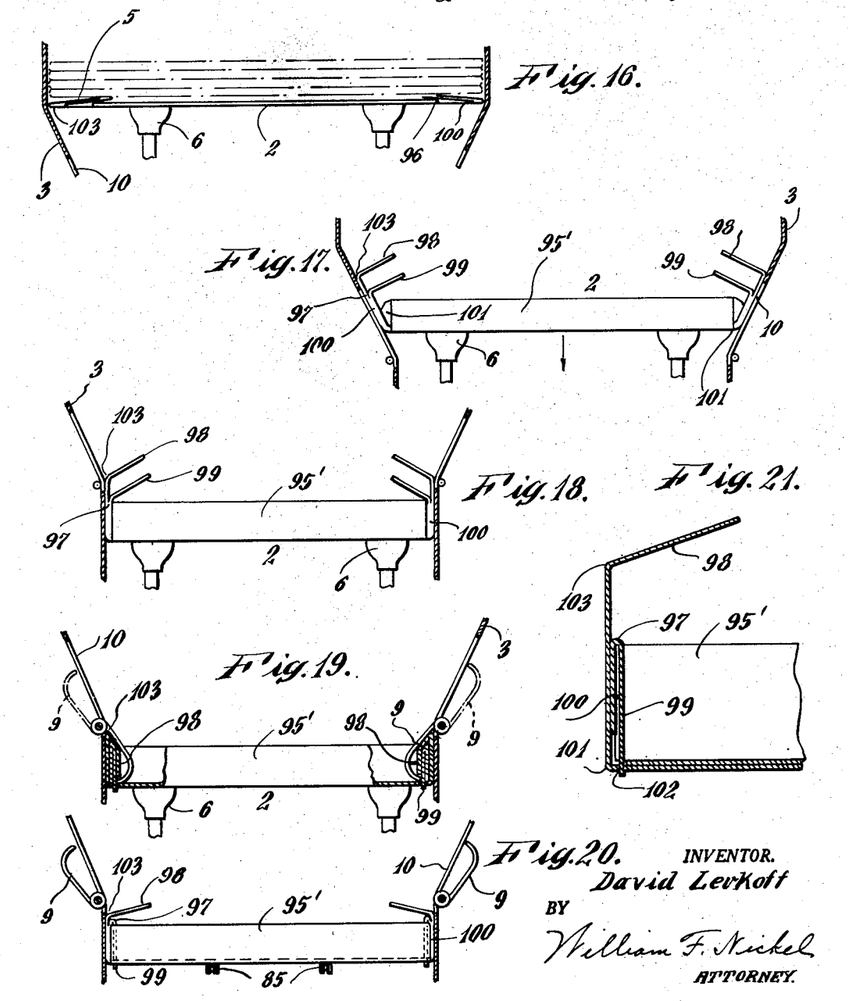
Figure 21 is a sectional view through one end of such a box fully completed.

When the folded boxes come out of the hopper, being pulled down by the cups 6, the end sections 100 are first turned upward by the converging extensions or bending members 3. Later when the arms 9 are operated and swung through the openings 10 in the members 3 they bend down the flaps 98 and 99 from the position shown in Figure 18 to that shown in Figures 19, 20 and 21. The two flaps are thus turned into the box and the flaps 99, hinged about a score line 97, are forced to project through holes 102 in the bottom. When the arms 9 are swung back the flaps 98, which have a transverse hinge line 103 at the middle, are released and take the positions shown in Figures 14, 20 and 21. These views show the box completed and ready to be filled and wrapped.

The contacts 63 and 64 are both insulatably mounted; and are so arranged that the circuit of the magnets 57 is closed long enough to make certain of the full operation of the arms 9.

The modified design of apparatus illustrated in Figures 22 to 33 inclusive works in the same way, but contains mechanical connections instead of electromagnets for actuating the arms 9. An electric motor, not shown, drives the belt 17 to turn the pulley 18 on shaft 19 of the reduction gearing in the case 20; and operates the air pump, not shown, connected as before to the cups 6. The shaft 21 in the case 20 again carries a pulley 22, connected by a belt 23 to similar pulley 22 on a shaft 27' in the framework 4. The shaft 27' bears the cam 41 for the valve controlling the pump; and the crank 30' connected by the link 32 to the bar 7 to move this bar in the guides 8 and the cups 6 up and down. The means for expelling the finished boxes from the apparatus, instead of chains with projections 12, comprises reciprocating bars 11' at the rear, movable forward and backward; and bearing projections or fingers 12' at their forward ends.

The shaft 27' projects from one side of the machine and carries on its outer end a fixed cam 131, that periodically lifts a vertical rod 132, mounted in a guide or bearing 133 on the framework 1. This bearing is fixed to a bracket 71' on the framework, and the upper end of the rod 132 is pinned to a vertical link 134, that in turn is pinned to a lever 135, rocking on a pivot pin or journal 136 at one side of the framework adjacent the lower end of the hopper 1. By means of a link 138 this rock lever is pinned to an arm 139, which is rigid with one end of the adjacent shaft 51 at the same side of the machine for bringing about the actuation of the associated gears 52 and 53 and causing the levers 9 to swing and bend in the flaps 99 of the blank as set forth above. This part of the apparatus is the same and works in the same way as the construction illustrated in detail on Figures 6 and 7, except that the magnets are replaced by the links and levers. The rod 132 has a roller 139 engaging the cam 131, and a spring 140 encircles the rod 132, being affixed to the bracket 71' and a projection 54a on the rod 132.

Rigid with the rocker 136 is an upright arm 141, in line with the journal or pivot 136, with its upper end pinned to a cross link 142. On the opposite side of the apparatus is a bellcrank lever 143, supported by a similar pivot 136 on a post 144. The link 142 is also pinned to the upper arm of the lever 143, and the lower arm of this lever is joined by a link 138 to a similar arm 130, which is rigid with the shaft 51 on that side; the shaft 51 bearing a gear 53 engaging a gear 52 to operate levers arranged in the same way as before to actuate the adjacent arm 9. The arms 130 are so joined to the links 138 and to the levers 135 and 143 that, when the rod 132 is pushed upward by the cam 131, the gears 52 and 53 in the box-shaped frames similar to those already described, cause the actuation of the levers 9 as required.

The shaft 27' also carries adjacent the cam 30' another cam 145, which pushes against a rod 146, mounted in a bearing 147 on the framework 4. The other end of the rod 146 is pinned to a rocker 148, pivoted at 149 on the framework 4, and extending upward; having a notch 150 in its upper end to receive a cross-bar 151. This bar is fastened to the ends of the rods 11', which reciprocate in bearings 152. Hence movement of the bar 146 by the cam 145 will urge the rods 11' forward. The bar 146 is returned by a spring 153, attached at one end to a projection 154 on bearing 147 and to a pin 155 on the bar 146.

In the framework 4, parallel with the shaft 27' is another shaft 156 bearing a pulley 157. This pulley is connected to a pulley 157' on the shaft 27' by a belt 158 and is thus driven by the shaft 27'. The pulley 157 has two grooves, one for the belt 158 and the other for a vertical belt 159 which couples the shaft 156 to a horizontal shaft 160 by means of a pulley 161, the shaft 160 extending across the framework at the top thereof. The shaft 161 carries a roller 162, which cooperates with a parallel roller 162 at the same level and mounted on a bracket 163 having a slot 164 in its lower end to be adjustably secured by a bolt 165 to the framework 4. See Figures 26 and 28. The rollers 162 carry discharge belts or bands 166, in grooves 167. The numeral 168 shows a pin-and-slot connection between the lever 143 and link 142.

Figures 6, 7:
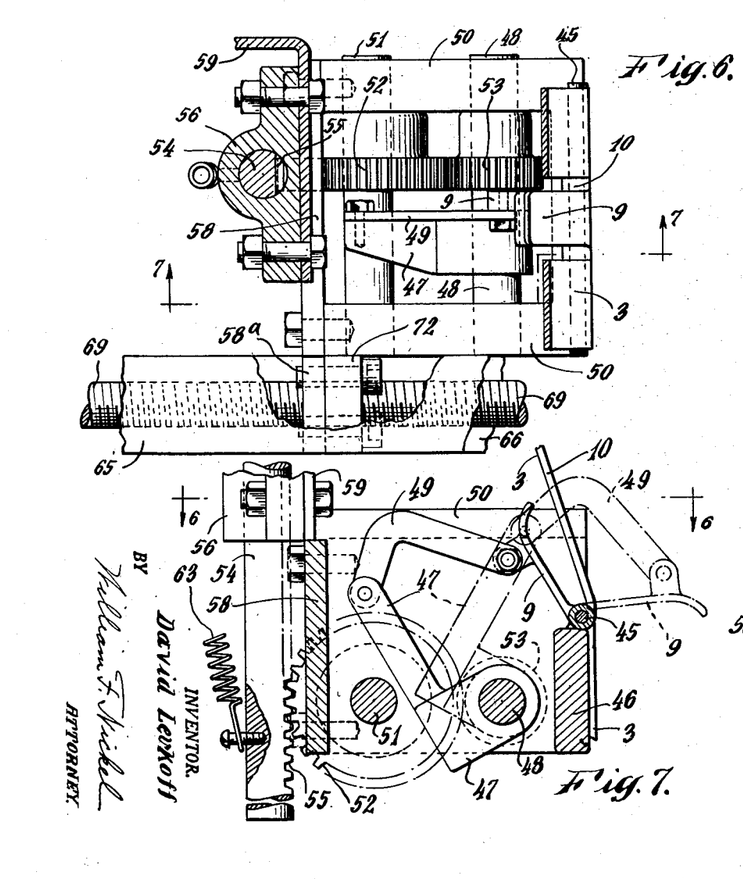
Figure 6 is a top plan, partly in section on line 6—6 in Figure 7 of the connections for actuating the bending levers.
Figure 7 is a vertical section on line 7—7 in Figure 6.
Figure 8:
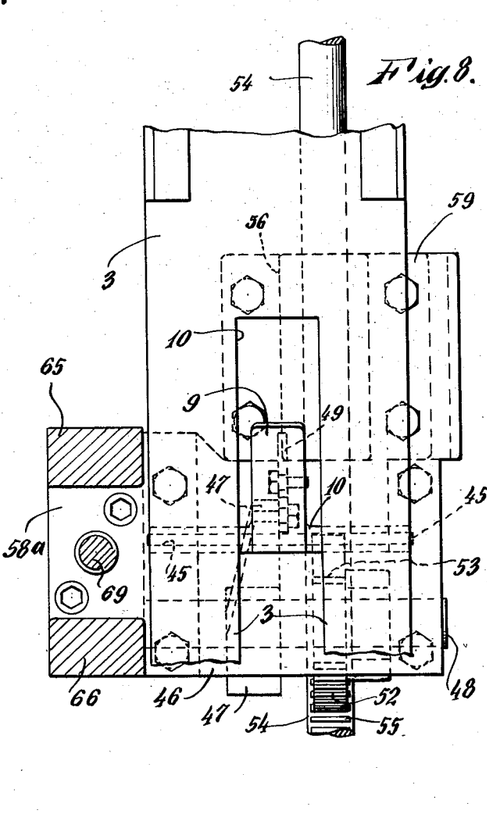
Figure 8 is a view in elevation on an enlarged scale of some of the parts at the top of Figure 5.
Figure 22:
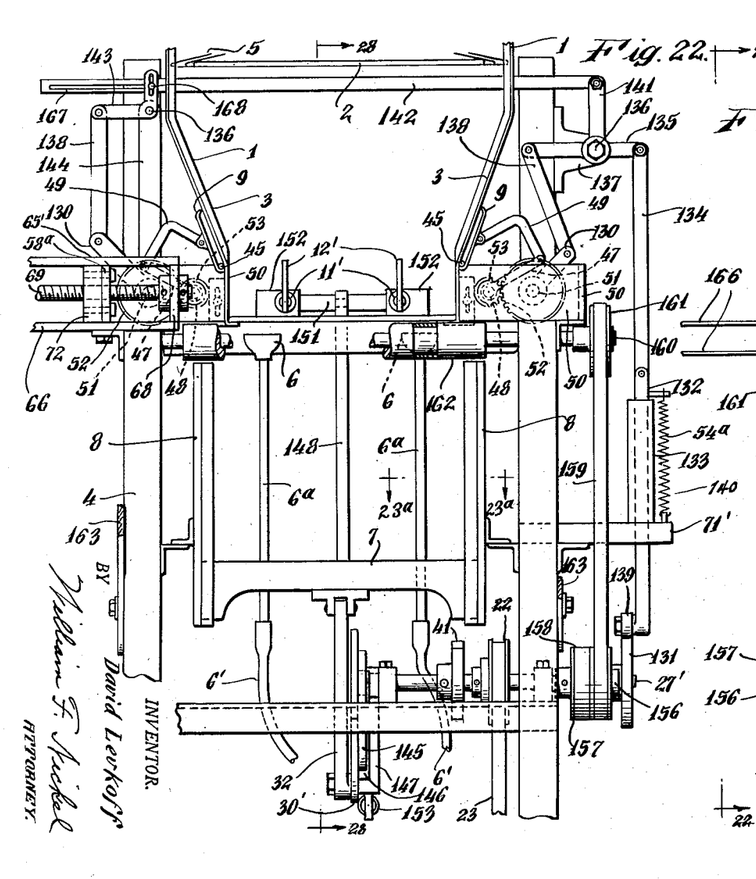
Figure 22 is a front elevation showing a different apparatus incorporating my invention, the view being from line 22—22 in Figure 23.
Figures 23, 23A:
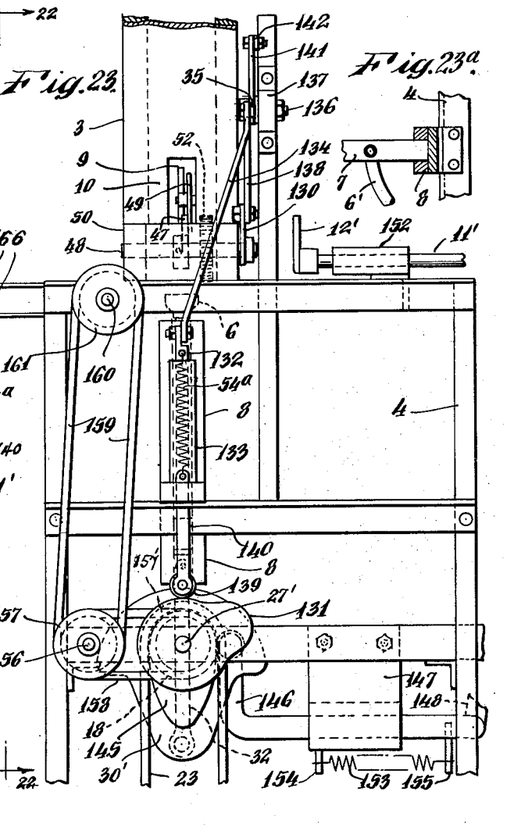
Figure 23 is a side elevation thereof.
Figure 23a shows a detail thereof.
Figure 24:
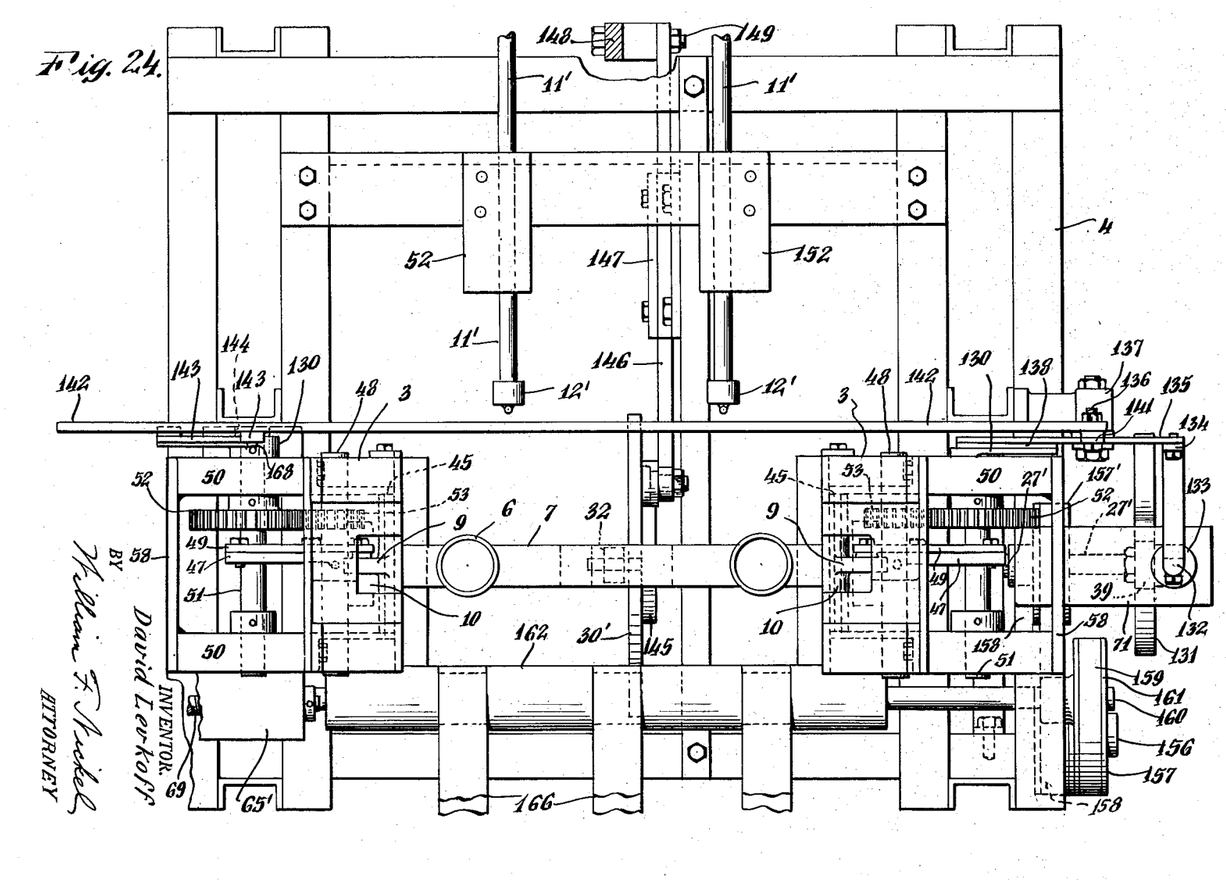
Figure 24 is a top plan, the hopper and driving motor being omitted.
Figures 25, 26, 27, 28:
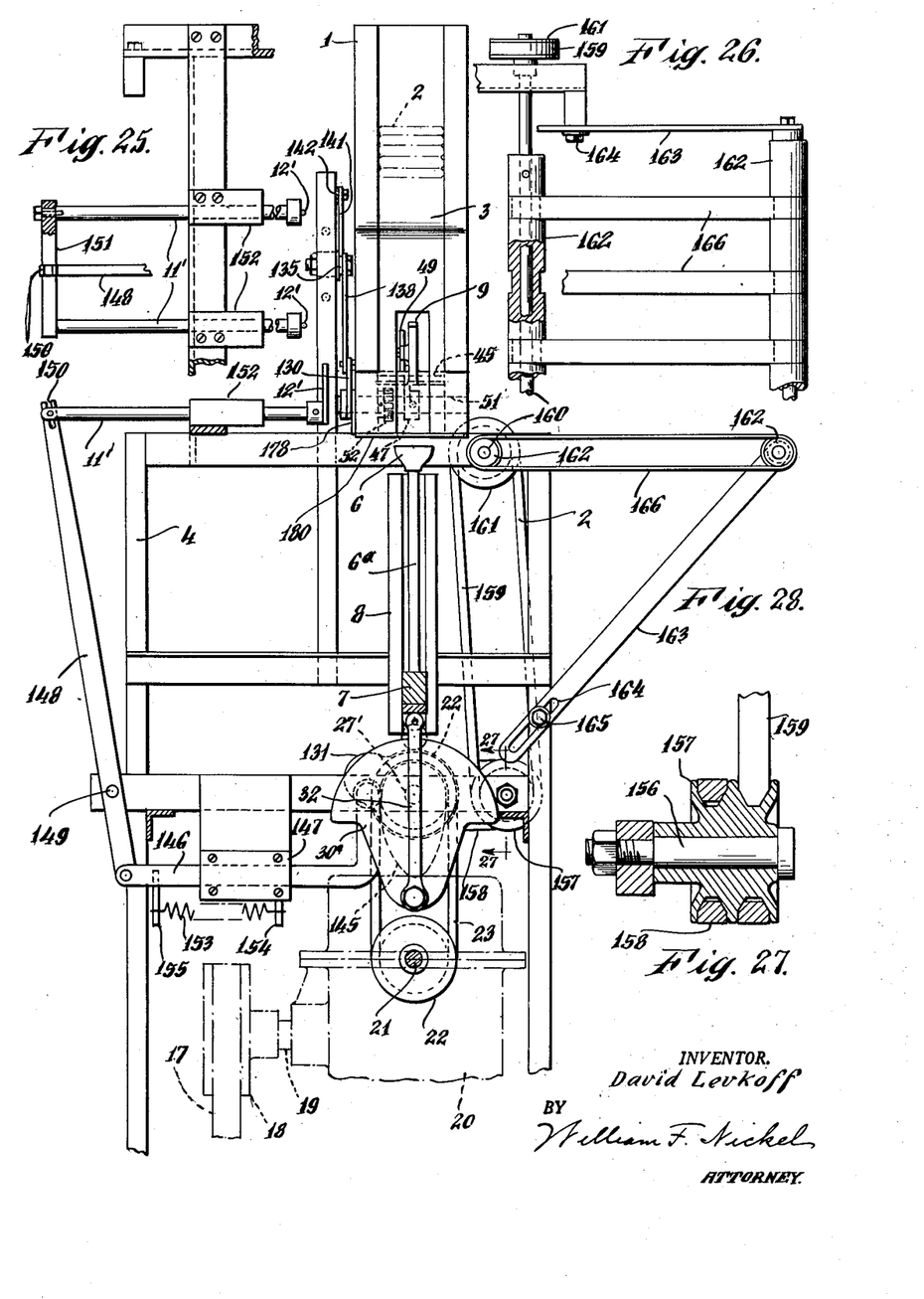
Figures 25, 26 and 27 show other details of this apparatus, Figure 27 being a section along line 27—27 on Figure 28.
Figure 28 is a section on line 28—28 of Figure 22.
Figures 29, 30, 31, 32, 33:
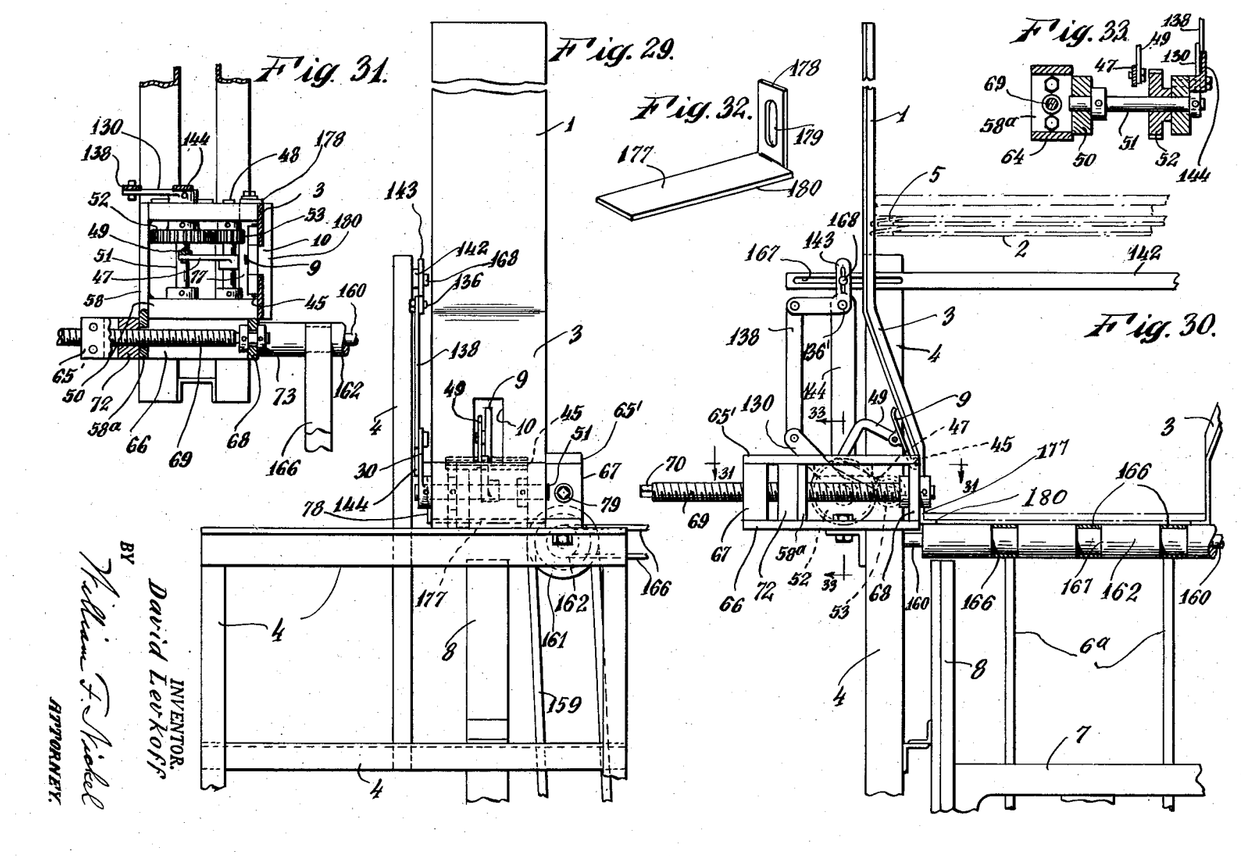
Figure 29 is an elevation viewed from the side opposite to that shown in Figure 23.
Figure 30 is a front elevation of the structure shown in Figure 29.
Figure 31 is a section on line 31—31 of Figure 30.
Figures 32 and 33 show further details of this embodiment of the invention.

The distance between the arms 9 is made adjustable by mounting the arms 9 in box-shaped or square frames of the type shown in Figures 6 and 7, and comprising the sides 46, 50 and 58, so that one of said square frames, for example the one at the right side in Figure 22 is fixed to the framework 4 stationary, while the other frame can be shifted. The box-shaped frames are also shown in Figures 24 and 31. Adjacent the front side of the one at the left is a vertical transversely extending frame comprising superposed top and bottom horizontal bars 65' and 66 respectively, joined rigidly at the ends by spacers 67 and 68. See Figures 24, 30 and 31. These bars and spacers are fixed on the framework 4. A threaded rod or bolt 69 is mounted in the spacers 67 and 68 as before, but turns loosely in openings bored in these spacers. The bolt is held against movement lengthwise by washers 73 at the end mounted in the spacer 68, the washers being in contact with both the inner and outer faces of this spacer. The back 58 of the adjacent box-shaped frame has an extension 58a as before; with an opening through which the bolt 69 loosely passes. On the bolt is a square block or cross head 72, with a threaded aperture for the bolt, and this cross head is bolted to extension 58a. The head 72 is engaged and held against turning by the bars 65' and 66. The top of the frame bearing the arm 9 rests loosely on the top of the framework 4. Hence turning the bolt by means of its square end 70 will move the arm and its associated parts towards or from the arm 9 at the opposite side of the machine. The framework is affixed at its end carrying the arm 9 to a shoe 177, having a projection 178 at one end with a slot 179. The shoe is placed beneath the box-shaped frame and the projection 178 is attached adjustably to the adjacent side piece 50. The forward edge of the shoe shown at 180 projects to a slight extent. This shoe slidably engages the top of the framework 4 and by means of it the horizontal position of the frame can be set as desired.

Having described my invention, what I believe to be new is:

1. Apparatus for setting up folded boxes having end sections with transverse fold lines thereon, said sections having inwardly foldable flaps, the apparatus comprising a hopper containing said folded boxes, converging members adjacent each side of the hopper, means for displacing said folded boxes successively from said hopper with their opposite end sections in contact with said converging members so that said end sections are thereby turned up along said fold lines, a pivoted means adjacent each of said converging members movable to engage said foldable end flaps and bend said flaps inwardly into position against the turned up end sections, and mechanism for operating said pivoted means.

2. Apparatus for setting up folded boxes having end sections with transverse fold lines thereon and upwardly foldable end flaps, the apparatus comprising an upright hopper containing said folded boxes, said hopper being open at its lower end, converging members adjacent each side of the hopper at said open end, pneumatic means for causing imbalanced air pressure to be exerted upon said folded boxes to displace them downward successively from said hopper with their opposite end sections in contact with said members, so that said sections comprising said flaps are turned up along said fold lines, a pivoted means adjacent each of said members to engage said foldable end flaps and bend said flaps inwardly into position against said turned up end sections, and mechanism for operating said pivoted means.

3. Apparatus for setting up folded boxes having end sections with transverse fold lines thereon, said sections having inwardly foldable flaps, the apparatus comprising a hopper containing said folded boxes, converging members adjacent each side of the hopper, means for displacing said folded boxes successively from said hopper with their opposite end sections in contact with said converging members so that said end sections are thereby turned up along said fold lines, a pivoted means adjacent each of said converging members movable to engage said foldable end flaps and bend said flaps inwardly into position against the turned up end sections, and mechanism for operating said pivoted means, said mechanism comprising an electromagnet for each of said pivoted means, an armature having rack teeth for each electromagnet, gearing actuated by said armatures when the electromagnets attract said armatures, and terminals controlled by the displacing means to close and open the circuit for said electromagnets.

4. Apparatus for setting up folded boxes having end sections with transverse fold lines thereon, said sections having inwardly foldable flaps, the apparatus comprising a hopper containing said folded boxes, converging members adjacent each side of the hopper, means for displacing said folded boxes successively from said hopper with their opposite end sections in contact with said converging members so that said end sections are thereby turned up along said fold lines, a pivoted means adjacent each of said converging members movable to engage said foldable end flaps and bend said flaps inwardly into position against the turned up end sections, and mechanism for operating said pivoted means, said apparatus having means for adjusting at least one of said pivoted means with respect to the sides of the hopper.

5. Apparatus for setting up folded boxes having end sections with transverse fold lines thereon, said sections having inwardly foldable flaps, the apparatus comprising a hopper containing said folded boxes, converging members adjacent each side of the hopper, means for displacing said folded boxes successively from said hopper with their opposite end sections in contact with said converging members so that said end sections are thereby turned up along said fold lines, a pivoted means adjacent each of said converging members movable to engage said foldable end flaps and bend said flaps inwardly into position against the turned up end sections, and mechanism for operating said pivoted means, said mechanism comprising links and levers connected to said means, a reciprocating rod to actuate said links and levers, and a shaft having a cam to operate rod.

DAVID LEVKOFF.

REFERENCES CITED

The following references are of record in the file of this patent:

UNITED STATES PATENTS

| Number | Name | Date |
| --- | --- | --- |
| 1,746,835 | Jones | Feb. 11, 1930 |
| 1,989,286 | Milmoe | Jan. 29, 1935 |
| 2,464,407 | Levkoff | Mar. 15, 1949 |

FOREIGN PATENTS

| Number | Country | Date |
| --- | --- | --- |
| 432,823 | Great Britain | Aug. 2, 1935 |